United States Patent
Mendenhall et al.

(10) Patent No.: US 11,055,788 B1
(45) Date of Patent: *Jul. 6, 2021

(54) SYSTEM AND METHOD FOR AUTOMATICALLY CREATING INSURANCE POLICY QUOTES BASED ON RECEIVED IMAGES OF VEHICLE INFORMATION STICKERS

(71) Applicant: STATE FARM MUTUAL AUTOMOBILE INSURANCE COMPANY, Bloomington, IL (US)

(72) Inventors: John Howard Mendenhall, Bloomington, IL (US); David Bruce Hutchison, Hoffman Estates, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/774,864

(22) Filed: Jan. 28, 2020

Related U.S. Application Data

(63) Continuation of application No. 14/511,360, filed on Oct. 10, 2014, now Pat. No. 10,559,037.

(51) Int. Cl.
*G06Q 40/08* (2012.01)

(52) U.S. Cl.
CPC ................... *G06Q 40/08* (2013.01)

(58) Field of Classification Search
USPC .......................................................... 705/4
See application file for complete search history.

(56) References Cited

U.S. PATENT DOCUMENTS

| | | | | |
|---|---|---|---|---|
| 9,020,837 B1* | 4/2015 | Oakes, III | .......... | G06Q 30/0271 705/26.1 |
| 2002/0116228 A1* | 8/2002 | Bauer | ................... | G06Q 40/08 705/4 |
| 2013/0290036 A1* | 10/2013 | Strange | .............. | G06Q 20/3276 705/4 |
| 2014/0270385 A1* | 9/2014 | Nepomniachtchi | .... | G06K 9/726 382/104 |

OTHER PUBLICATIONS

"Software as a Service: Strategic Backgrounder," Software & Information Industry Association, Feb. 2001.

(Continued)

*Primary Examiner* — Jason Borlinghaus
*Assistant Examiner* — Ambreen A Alladin
(74) *Attorney, Agent, or Firm* — Marshall, Gerstein & Borun LLP

(57) ABSTRACT

A system and method may automatically create auto insurance policy quotes using data obtained by processing an image of a vehicle information sticker. An image of a vehicle information sticker may be received and analyzed using optical character recognition or some other method. The data acquired from the image can be used to identify a particular vehicle, and retrieve data corresponding to the particular vehicle. The customer data, vehicle data, and other data can be used to calculate an insurance policy quote. The created quotes can then be presented to a user for purchase.

15 Claims, 7 Drawing Sheets

(56) References Cited

OTHER PUBLICATIONS

GEICO (May 22, 2012), GEICO App adds new feature enhancements [Press Release]; https://www.geico.com/about/pressreleases/2012/20120522/.

Pocket Agent App, State Farm Insurance, Google Play, Retrieved from Internet at: <https://play.google.com/store/apps/details?id+com.statefarm.pocketagent> on Mar. 13, 2015.

Progressive App, Progressive Insurance, Google Play, Retrieved from Internet at: <https://play.google.com/store/apps/details?id=com.phonevalley.progressive> on Mar. 13, 2015.

* cited by examiner

300

INPUT

| NAME | | |
|---|---|---|
| SEX ○ M ○ F | BIRTHDAY | [V|MONTH] [V|DAY] [V|YEAR] ←302 |

ADDRESS 1 [_____] ←304
ADDRESS 2 [_____]
CITY [____] STATE [V|__] ZIP [____]

○ OWNER  ○ RENTER

OCCUPATION [_____]
INCOME [V| INCOME RANGES]

MARITAL STATUS  ○ SINGLE  ○ MARRIED
SPOUSE BIRTHDAY  BIRTHDAY [V|MONTH] [V|DAY] [V|YEAR]
SPOUSE OCCUPATION [_____]
SPOUSE INCOME [_____]

HOW MANY CARS DO YOU OWN [V|__]
CAR 1:
MAKE [V|__] [V|MODEL] [V|YEAR] [V|MILEAGE]
CAR 2:
...

310 encompasses the form fields above.

FIG. 3

SYSTEM AND METHOD FOR AUTOMATICALLY CREATING INSURANCE POLICY QUOTES BASED ON RECEIVED IMAGES OF VEHICLE INFORMATION STICKERS

CROSS REFERENCE TO RELATED APPLICATIONS

This application claims the benefit of U.S. application Ser. No. 14/511,360 (filed on Oct. 10, 2014). The entirety of each of the foregoing application is incorporated by reference herein.

FIELD OF THE DISCLOSURE

This disclosure relates to a system and method for automatically generating insurance policy quotes based on user data and a received image of a vehicle information sticker.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A number of factors are considered by insurance providers for calculating auto insurance policy quotes. One factor for determining an appropriate auto insurance premium is the particular vehicle being insured. A vehicle information sticker, also known as a Monroney sticker, typically contains all the necessary data about a particular vehicle needed to calculate insurance premiums. Since a Monroney sticker is legally required to be displayed in all new vehicles for sale at a dealership, it can easily be implemented in an insurance policy creation strategy.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One embodiment of the techniques of this disclosure is a computer-implemented method for automatically creating insurance policy quotes. The method may include receiving, via one or more computing devices, customer data corresponding to a customer to be insured. The method may further include receiving an image of a vehicle information sticker corresponding to a vehicle to be insured. The method may include processing, by one or more processors, the image of the vehicle information sticker to identify a particular vehicle. Still further, the method may include retrieving, via a computer network, vehicle data corresponding to the particular vehicle from one or more databases. The method may include creating one or more insurance policy quotes based at least in part on the received customer data and retrieved vehicle data.

In other embodiments, a computer device may be implemented to automatically create insurance policy quotes. The computer device may comprise one or more processors and one or more memories coupled to the one or more processors. The one or more memories may include computer executable instructions stored therein that, when executed by the one or more processors, cause the one or more processors to perform a plurality of functions. For example, the functions may cause the one or more processors to receive customer data corresponding to a customer to be insured. The functions may then cause the one or more processors to receive an image of a vehicle information sticker corresponding to a vehicle to be insured. Further, the functions may cause one or more processors to process the image of the vehicle information sticker to identify a particular vehicle. The functions may then cause the one or more processors to retrieve vehicle data corresponding to the particular vehicle from one or more databases. Still further, the functions may cause the one or more processors to create one or more insurance policy quotes based at least in part on the received customer data and vehicle data.

In still other embodiments, a tangible computer-readable medium may include non-transitory computer readable instructions stored thereon to automatically create insurance policy quotes. For example, the instructions may include receiving customer data corresponding to a customer to be insured. Further, the instructions may include receiving an image of a vehicle information sticker corresponding to a vehicle to be insured. The instructions may then comprise processing the image of the vehicle information sticker to identify a particular vehicle. Still further, the instructions may include retrieving vehicle data corresponding to the particular vehicle from one or more databases. The instructions may then comprise creating one or more insurance policy quotes based at least in part on the received customer data and vehicle data.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 3 is an illustration of an example user interface for entering customer information;

The figures depict embodiments of the present invention for purposes of illustration only. One skilled in the art will readily recognize from the following discussion that alternate embodiments of the structures and methods illustrated herein may be employed without departing from the principles of the invention described herein.

DETAILED DESCRIPTION

Figure 1:
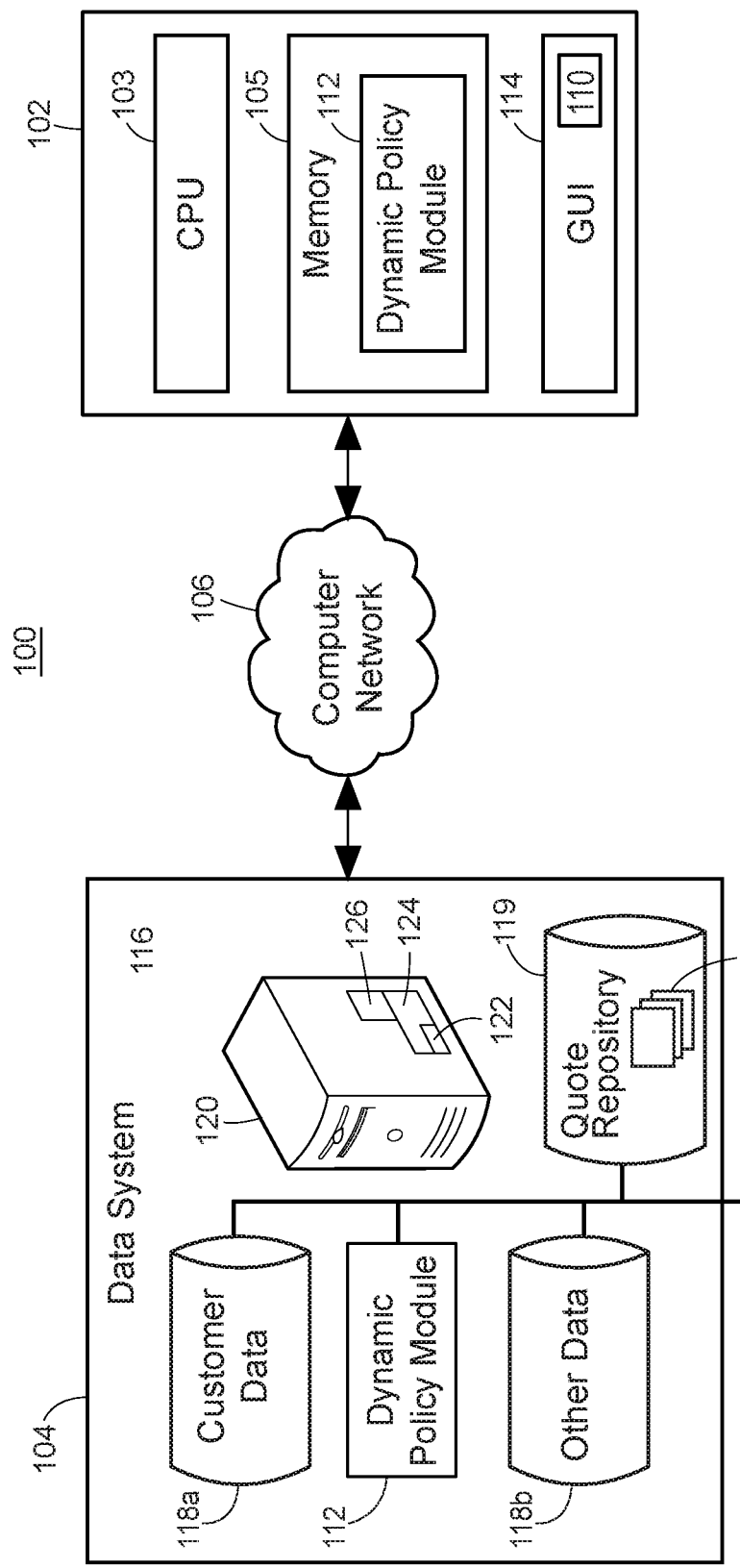
FIG. 1 is a simplified and exemplary block diagram of a system for dynamic insurance policy quote creation based on information obtained from an image of a vehicle information sticker.

FIG. 1 generally illustrates one embodiment for a system 100 to create and present an auto insurance policy to a potential customer using information obtained from an image of a vehicle information sticker. The system 100 includes hardware and software applications, as well as various data communication channels for facilitating data communications between the various hardware and software components. The system 100 may include a client 102 as a front end component and backend components 104 in communication with each other via a communication link 106 (e.g., computer network, internet connection, etc.). FIG. 1 illustrates a block diagram of a high-level architecture of dynamic auto insurance policy creation and presentation system 100 including various software or computer-executable instructions and hardware components or modules that may employ the software and instructions to create insurance policies based on information obtained from an image of a vehicle information sticker. The various modules may be implemented as computer-readable storage memories containing computer-readable instructions (i.e., software) for execution by a processor of the computer system 100. The modules may perform the various tasks associated with creating and presenting auto insurance policies and obtaining information from an image of a vehicle information sticker, as herein described. The computer system 100 also includes both hardware and software applications, as well as various data communications channels for communicating data between the various hardware and software components.

The client 102 may receive an image of a vehicle information sticker and send the image to the backend components 104 to complete insurance policy creation and presentation. For example, the client 102 may be a computing device including a CPU 103 and one or more computer readable memories 105. The client 102 may be capable of executing a graphical user interface (GUI) 110 for a dynamic policy module 112 within a web browser 114. In some embodiments, the client 102 executes instructions of a network-based data system 116 to receive potential customer data 118a, other data 118b, and vehicle data 118c via the computer network 106 for display in the GUI 110. The backend components 104 may receive the data 118a, 118b, 118c from the client 102 via the computer network 106 upon execution of a dynamic policy module 112 by a system processor.

The dynamic policy module 112 may create auto insurance policy quotes 119a and cause the quotes 119a to be stored in a quote data repository 119. Generally, each quote 119a is a data structure defining coverage and conditions for an insurance policy between the insurance company and a potential customer, where the data structure includes a plurality of data to be presented to the user. Generally, auto insurance policy quotes are calculated based on factors including customer data 118a, other data 118b, and vehicle data 118c.

The client 102 may be a smart phone, tablet computer, personal computer or other suitable computing device. While only one client 102 is illustrated in FIG. 1 to simplify and clarify the description, it will be understood that any number of client devices are supported and may be in communication with the backend components 104. Further, while only one CPU 103, Memory 105, and GUI 114 is illustrated in the client 102, the client 102 may support any number of these components.

The client may contain a GUI 110 which may communicate with the system 116 through the Internet 106 or other type of suitable network (local area network (LAN), a metropolitan area network (MAN), a wide area network (WAN), a mobile, a wired or wireless network, a private network, a virtual private network, etc.). A system server 120 may send and receive information and data 118a, 118b, 118c for the system 100 such as computer-executable instructions and data associated with applications executing on the client 102 (e.g., the dynamic policy module 112). The applications executing within the system 100 may include cloud-based applications, web-based interfaces to the data system 116, software applications executing on the client 102, or applications including instructions that are executed and/or stored within any component of the system 100. The applications, GUI 110, browser 114, and module 112 may be stored in various locations including separate repositories and physical locations.

In some embodiments, the data system 116 in general and the server 120 in particular may include computer-executable instructions 122 stored within a memory 124 of the server 120 and executed using a processor 126. The instructions 122 may instantiate a policy creation tool 112 or send instructions to the client 102 to instantiate a GUI 110 for the tool 112 using a web browser application 114 of a client 102. In some embodiments, the browser application 114, GUI 110, dynamic policy module 112, and elements of the data system 116 may be implemented at least partially on the server 120 or the client 102. The data system 116 and processor 126 may execute instructions 122 to display the GUI 110 including the data 118a, 118b, 118c within a display of the client 102 or server 120 (not shown).

The dynamic policy module 112 may include the functionality of a camera, or have access to camera functionality of the client device 102. Thus, the module 112 may be able to take a digital photo or digital video of a vehicle information sticker to obtain data for creating insurance policy quotes. The module 112 may also receive an image of a vehicle information sticker from the memory 105 of the client device 102.

The dynamic policy module 112 may include various instructions for execution by a processor 126 to create policy quotes. For example, the module 112 may create quotes 119a by analyzing data obtained from an image of a vehicle information sticker along with customer data 118a, other data 118b, and vehicle data 118c. Further, the dynamic policy module 112 may implement optical character recognition (OCR) technology to obtain data from the image of the vehicle information sticker.

The dynamic policy module 112 may then present the one or more created quotes 119a. In response to presenting the one or more created quotes 119a, the module may receive an indication that one of the presented quotes 119a is to be edited. If a quote is edited the dynamic policy module 112 may recalculate and present new quotes 119a. The dynamic policy module may also receive an indication of a policy purchase when the quotes 119a are presented.

In an aspect, the module 112 may be a client application that may be implemented as a series of machine-readable instructions for performing the various tasks associated with implementing the dynamic policy creation system 100 as well as receiving information, displaying information, and/or or transmitting information between device 102 and server 120.

In various aspects, the module 112 may be implemented as a stand-alone system or as a system wherein the front-end components 102 communicate with back-end components 104 as described herein. Additionally, the module 112 may include machine-readable instruction for implementing a user interface to allow a user to input commands to and receive information from the dynamic policy creation system 100 in accordance with the functionality supported by the module 112.

The module 112 may be a native web browser, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server 120 or other back-end components 104 while also receiving inputs from the user. The module 112 may include an embedded web browser that may be implemented as a series of machine-readable instructions for receiving, interpreting, and displaying web page information from the servers 120 or other back-end components 104 within client device 102.

In an aspect, module 112 may be an application that is installed on device 102. For example, the dynamic policy module 112 may be downloaded and installed to device 102 by a user. In an aspect, module 112 may include instructions for implementing a user interface to allow a user to input commands and/or respond to prompts. For example, module may allow a user to input customer data (name, address, etc.) or a user login, take and submit pictures of vehicle information stickers, receive insurance policy purchases, etc.

Figure 2:
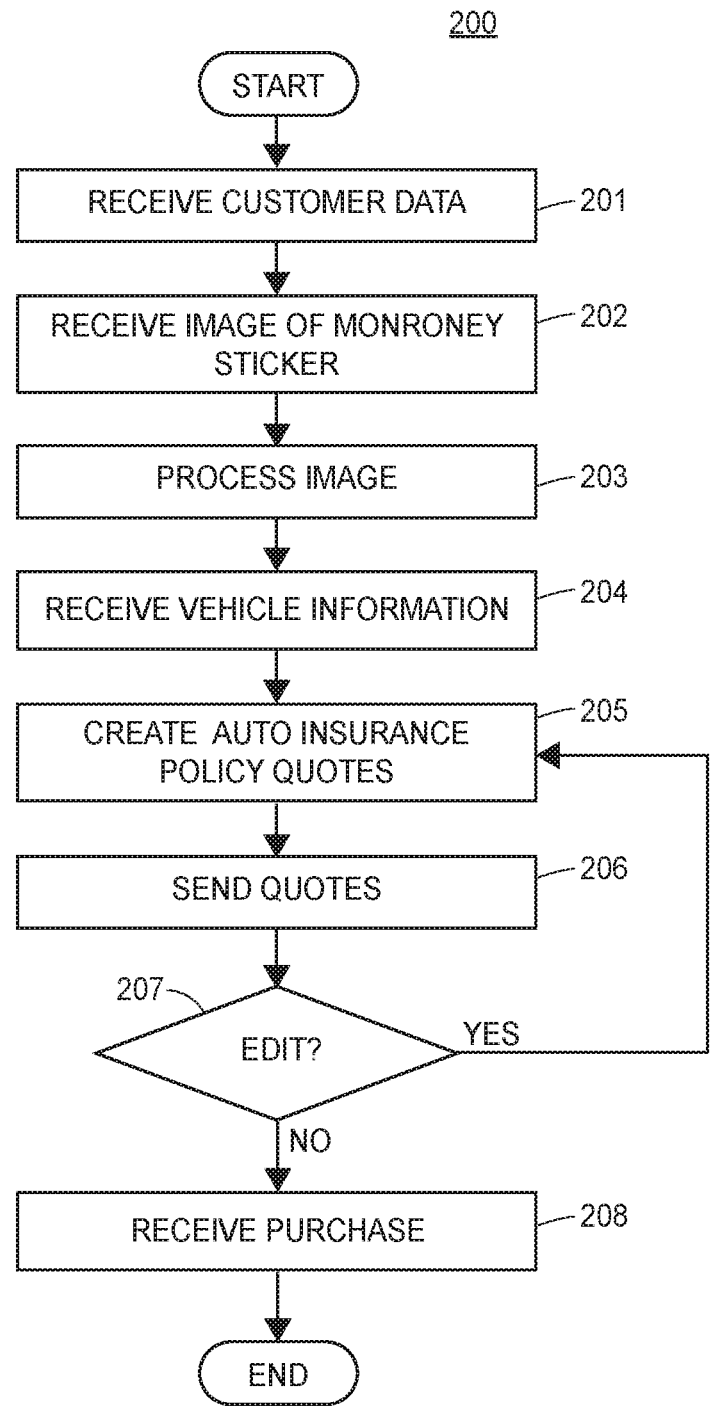
FIG. 2 is a flow chart illustrating an exemplary method for a dynamic insurance policy quote creation based on information obtained from an image of a vehicle information sticker.

With reference to FIG. 2, the system 100 described herein may be employed in a method 200 to create insurance policy quotes based on data obtained through an image of a vehicle information sticker. The method 200 may include one or more functions or routines in the form of non-transitory computer-executable instructions that are stored in a tangible computer-readable storage medium and executed using a processor of a computing device (e.g., the client 102, the server 120, or any combination of computing devices within the system 100). The routines may be included as part of any of the modules described in relation to FIG. 1 above, or FIG. 7, below, or as part of a module that is external to the system illustrated by FIGS. 1 and 7. For example, the method 200 may be part of a browser application or another application running on the client 102 as a plugin or other module of the browser application. Further, the method 200 may be employed as "software-as-a-service" to provide a client 102 with access to the data system.

The method 200 may begin after the system 100 receives customer data (Block 201). In an embodiment, the system may receive customer data from the customer database 118a. For example, a user may login to the system by entering a user name and password, which would correspond to an entry in the customer database 118a. In another embodiment, the system may receive customer data through a user interface, such as the example interface 300 of FIG. 3.

The interface 300 may be implemented by the system to receive customer data for a new customer that does not exist in the database 118a, or to receive data missing for an incomplete customer profile in the database 118a. In some embodiments, the interface 300 may include a plurality of survey questions 310, some with selectable responses 302 and some with written responses 304. The questions may include a collection of statements that elicit corresponding responses 302 and 304. In some embodiments, the interface includes a mix of demographic questions and lifestyle questions which are relevant for creating insurance policy quotes. Survey questions 310 may include a statement or question of facts about the customer such as age, residence zip code, income, etc. Responses to questions 310 may allow the dynamic policy tool 112 to use the received data to create relevant insurance policy quotes 119a for the user at the computing device 102.

The method 200 may then execute instructions causing the dynamic policy module 112 to receive an image of a vehicle information sticker (Block 202). In an embodiment, the dynamic policy module 112 may implement a camera function of the client device 102 to capture an image of a vehicle information sticker. In another embodiment, the module 112 may receive an image of the vehicle information sticker from the memory 105 of the client 102. In still another embodiment, the dynamic policy module may receive more than one image of a vehicle information sticker.

Figure 4:
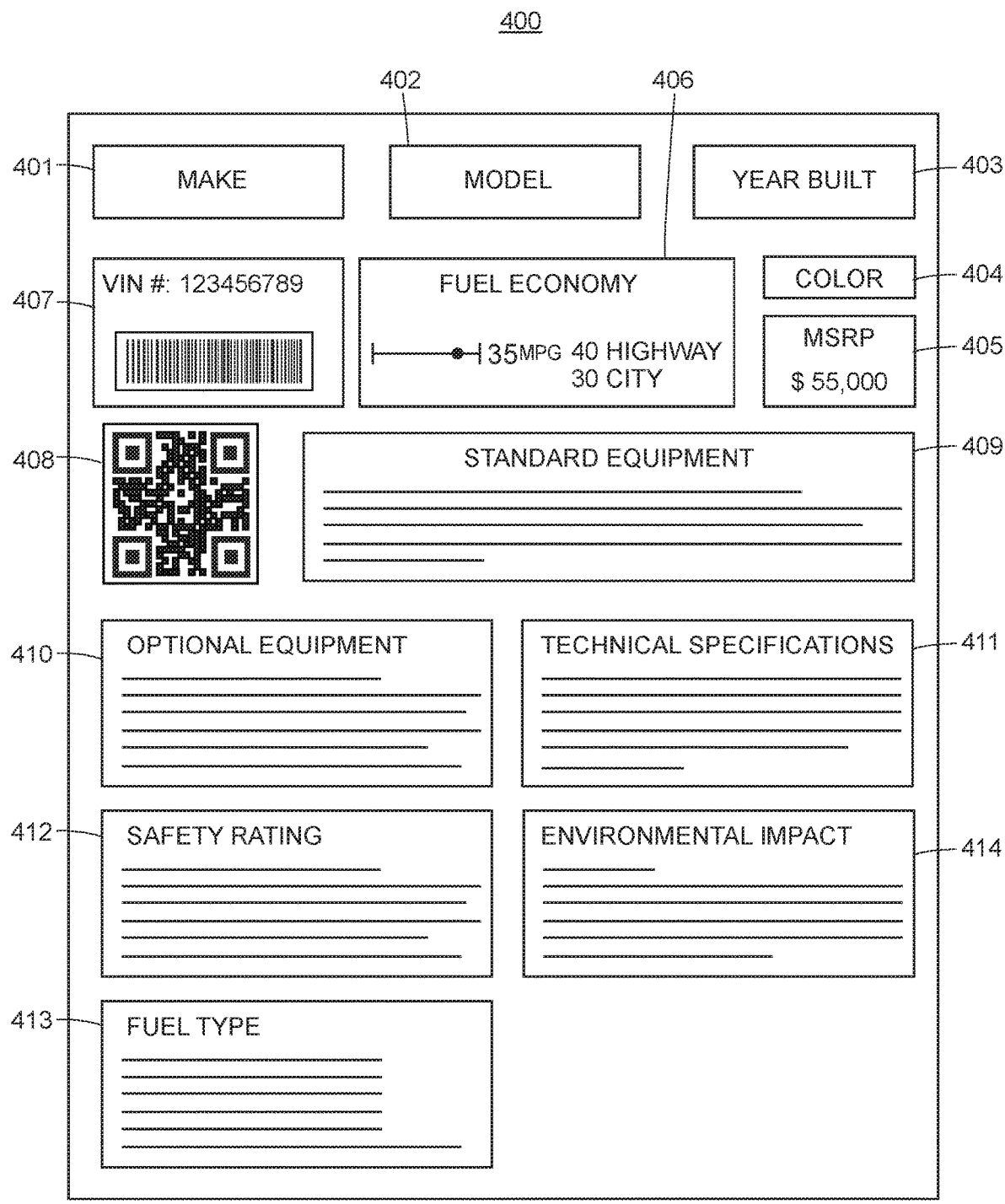
FIG. 4 is an illustration of an example of an image of a vehicle information sticker.

FIG. 4 is an illustration of an example of a vehicle information sticker 400. The vehicle information sticker 400 contains various information about a vehicle that can be used in creating insurance policy quotes such as make 401, model 402, year 403, color 404, suggested retail price 405, fuel economy 406, vehicle identification number (VIN) 407, a Quick Response Code (QR code) 408, standard equipment 409, optional equipment 410, technical specifications 411, safety rating 412, fuel type 413, and environmental impact (greenhouse gas rating or carbon footprint) 414. A vehicle information sticker 400 may contain some, all, or any combination of the elements shown in the example 400. The example vehicle information sticker 400 is not intended to be limiting, and can contain information not shown in the example.

Further, the term "vehicle information sticker" is not intended to be limiting. The "vehicle information sticker" does not necessarily have to be fixed to a place or object by an adhesive. Any graphic or data sheet with information representing a particular vehicle can be considered a "vehicle information sticker" and used by the dynamic policy module 112. For example, a technical specification list containing data corresponding to a particular vehicle 150 (FIG. 1) may be used by the system in an embodiment.

After receiving the image of the vehicle information sticker, the method 200 may execute instructions causing the dynamic policy module 112 to process the image 400 (Block 203). The module 112 may employ techniques such as optical character recognition, bar-code scanning, QR code scanning, etc. to interpret information provided in the vehicle information sticker 400. The module 112 may use one or more of the various elements 401-414 to identify a particular vehicle 150 from the vehicle data 118c. For example, the module 112 may interpret a VIN 407 in the image 400. The module may then identify a particular vehicle 150 from the vehicle database 118c, corresponding to the VIN 407. In another embodiment the module 112 may identify a particular vehicle 150 from the vehicle database 118c based on the make 401, model 402, and year 403. Any combination of the interpreted elements 401-414 may be used to identify a particular vehicle 150.

The method 200 may then cause the dynamic policy module 112 to retrieve vehicle information corresponding to the particular identified vehicle 150 (Block 204). In one embodiment the module 112 retrieves the information processed at function 203 for the particular identified vehicle 150. In another embodiment, the module 112 may retrieves vehicle information from the databases 118a-c corresponding to particular identified vehicle.

The method 200 may then cause the dynamic policy module 112 to create one or more auto insurance quotes using the gathered data of function 201 and 204 (Block 205). The module 112 may further receive customer data 118a, other data 118b, and vehicle data 118c corresponding to the particular identified vehicle. The module 112 may then calculate, using the received data, one or more auto insurance quotes. Each policy quote 119a, created by the module 112, may be stored in the policy data repository 119 before being communicated to the client device 102 via the network 106 and presented within a user interface.

Figure 5:
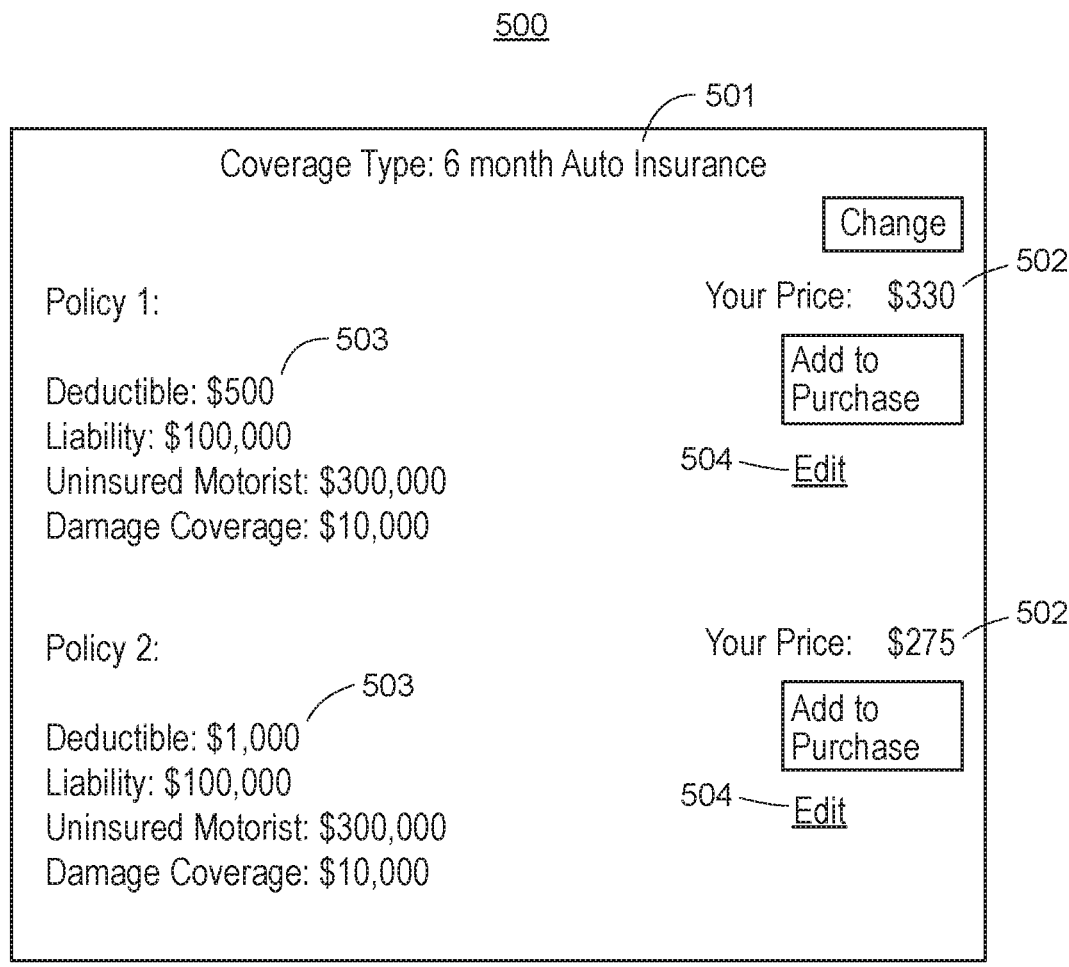
FIG. 5 is an illustration of an example user interface for displaying insurance policy quotes.

After creating the insurance policy quotes, the method 200 may then execute instructions to send the created quotes 119a to be presented (Block 206). The system may execute an instruction to have the dynamic policy module 112 send data including one or more quotes 119a and present the quotes 119a in a GUI 110 on a web browser 114 to a potential customer using a client 102 via communication link 106 (e.g., user interface 500 of FIG. 5). In some embodiments the interface 500 may include one or more presented quotes 119a. The presented quotes 119a may also include various information about the policy, such as duration 501, cost 502, deductible 503, etc. Further, the interface 500 may provide a graphic element 504 for the system to receive an indication that a policy is to edited.

Figure 6:
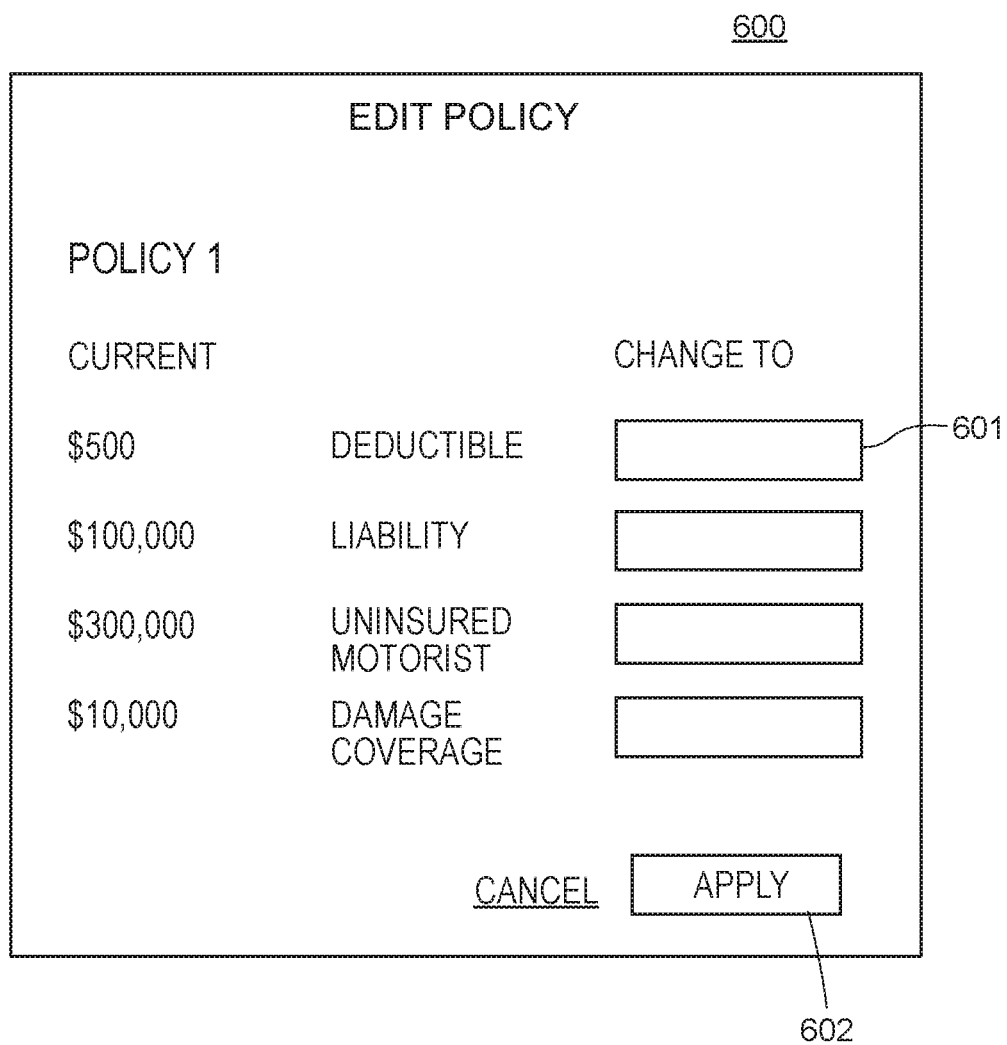
FIG. 6 is an illustration of an example user interface for editing an insurance policy.

The method 200 may then receive an indication that the user has chosen to edit a policy quote 119a, the method 200 may then implement a user interface for editing (Block 207). FIG. 6 is an example of an editing interface 600. The system may present blank text fields 601 to receive changes to different elements of an auto insurance policy (deductible, liability, etc.) that may affect the premium. The interface 600 may include a graphic element 602 to receive an indication that editing is complete. When the graphical element 602 is activated, the method may return to function 205 to recreate quotes including the edited policy elements.

The system may receive a purchase transaction of an insurance policy 119a (Block 208). Upon receiving a purchase transaction, the method 200 of the system 100 is complete.

Figure 7:
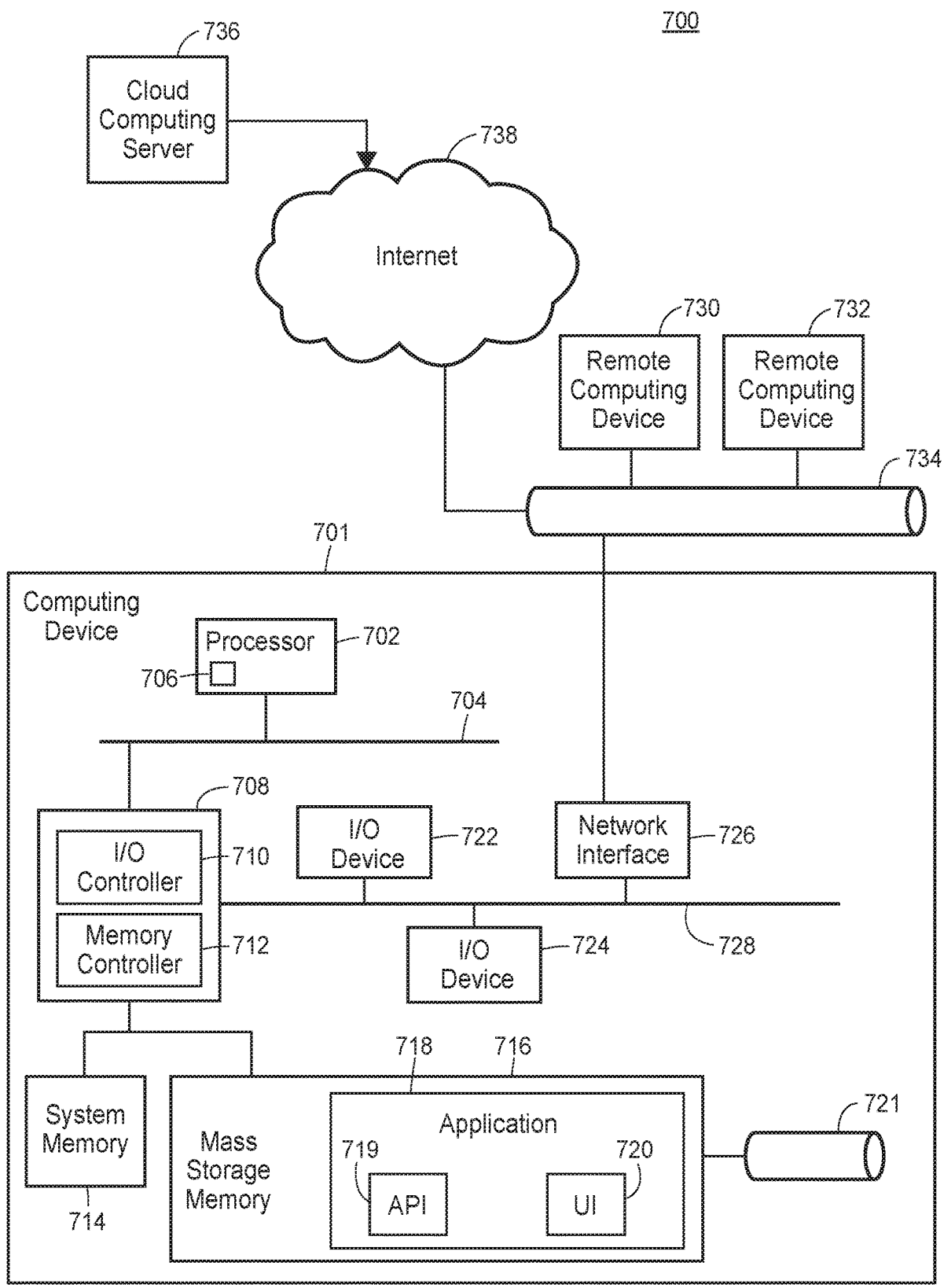
FIG. 7 illustrates a block diagram of a computer to implement the various user interfaces, methods, functions, etc., for dynamic auto insurance policy creation based on information obtained from an image of a vehicle information sticker in accordance with the described embodiments.

FIG. 7 illustrates an exemplary computing environment for implementing the system 100 and method 200, as described herein. As shown in FIG. 7, the computing device 701 includes a processor 702 that is coupled to an interconnection bus 704. The processor 702 includes a register set or register space 706, which is depicted in FIG. 7 as being entirely on-chip, but which could alternatively be located entirely or partially off-chip and directly coupled to the processor 702 via dedicated electrical connections and/or via the interconnection bus 704. The processor 702 may be any suitable processor, processing unit or microprocessor. Although not shown in FIG. 7, the computing device 701 may be a multi-processor device and, thus, may include one or more additional processors that are identical or similar to the processor 702 and that are communicatively coupled to the interconnection bus 704.

The processor 702 of FIG. 7 is coupled to a chipset 708, which includes a memory controller 712 and a peripheral input/output (I/O) controller 710. As is well known, a chipset typically provides 1/O and memory management functions as well as a plurality of general purpose and/or special purpose registers, timers, etc. that are accessible or used by one or more processors coupled to the chipset 708. The memory controller 712 performs functions that enable the processor 702 (or processors if there are multiple processors) to access a system memory 714 and a mass storage memory 716.

The system memory 714 may include any desired type of volatile and/or non-volatile memory such as, for example, static random access memory (SRAM), dynamic random access memory (DRAM), flash memory, read-only memory (ROM), etc. The mass storage memory 716 may include any desired type of mass storage device. For example, if the computing device 701 is used to implement a dynamic policy application 718 having an API 719 (including functions and instructions as described by the method 200 of FIG. 2), and user interface 110 to receive user input, the mass storage memory 716 may include a hard disk drive, an optical drive, a tape storage device, a solid-state memory (a flash memory, a RAM memory, etc.), a magnetic memory (e.g., a hard drive), or any other memory suitable for mass storage. In one embodiment, non-transitory program functions, modules and routines (an application 718, an API 719, and the user interface 110, etc.) are stored in mass storage memory 716, loaded into system memory 714, and executed by a processor 702 or can be provided from computer program products that are stored in tangible computer-readable storage mediums (RAM, hard disk, optical/magnetic media, etc.). Mass storage 716 may also include a cache memory 721 storing application data, user profile data, and timestamp data corresponding to the application data, and other data for use by the application 718.

The peripheral I/O controller 710 performs functions that enable the processor 702 to communicate with peripheral input/output (I/O) devices 722 and 724, a network interface 726, via a peripheral I/O bus 728. The I/O devices 722 and 724 may be any desired type of I/O device such as a keyboard, a display (a liquid crystal display (LCD), a cathode ray tube (CRT) display, etc.), a navigation device (a mouse, a trackball, a capacitive touch pad, a joystick, etc.), etc. The I/O devices 722 and 724 may be used with the application 718 to provide a dynamic policy module 112 and web interface 400 as described in relation to the figures. The local network transceiver 728 may include support for Wi-Fi network, Bluetooth, Infrared, cellular, or other wireless data transmission protocols. In other embodiments, one element may simultaneously support each of the various wireless protocols employed by the computing device 701. For example, a software-defined radio may be able to support multiple protocols via downloadable instructions. In operation, the computing device 701 may be able to periodically poll for visible wireless network transmitters (both cellular and local network) on a periodic basis. Such polling may be possible even while normal wireless traffic is being supported on the computing device 701. The network interface 726 may be an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 712 and the I/O controller 710 are depicted in FIG. 7 as separate functional blocks within the chipset 708, the functions performed by these blocks may be integrated within a single integrated circuit or may be implemented using two or more separate integrated circuits. The system 700 may also implement the user interfaces 300, 500 and 600 and dynamic policy module 112 on remote computing devices 730 and 732. The remote computing devices 730 and 732 may communicate with the computing device 701 over a network link 734. For example, the computing device 701 may receive an image of a vehicle information sticker from an application executing on a remote computing device 730, 732. In some embodiments, the application 718 including the user interfaces 300, 500 and 600 and module 112 may be retrieved by the computing device 701 from a cloud computing server 736 via the Internet 738. When using the cloud computing server 736, the retrieved application 718 may be programmatically linked with the computing device 701. The dynamic policy module application 718 may be a Java® applet executing within a Java® Virtual Machine (JVM) environment resident in the computing device 701 or the remote computing devices 730, 732. The application 718 may also be "plug-ins" adapted to execute in a web-browser located on the computing devices 701, 730, and 732. In some embodiments, the application 718 may communicate with backend components such as the data system 104 via the Internet 738 or other type of network.

Using the system 100 and method 200 described herein, a dynamic policy module 112 and interfaces 300, 500 and 600 coupled with the method 200 may implement a dynamic insurance creation methodology to better service, retain, and expand a business' potential customer base. By implementing the dynamic creation policies by the module 112, potential customers may have access to auto insurance coverage that is simple and quick. In an insurance business, this instant creation of policies may help cater to the needs of potential customers while also providing a new avenue for sales. For example, the cost of auto insurance can be an important factor for a customer shopping for a new car. By providing the customer with a tool that can easily and accurately calculate insurance policy quotes, the insurance provider can help the customer make a decision for both the car purchase and insurance coverage.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 112, may include but is not limited to any combination of a LAN, a MAN, a WAN, a mobile, a wired or wireless network, a private network, or a virtual private network. Moreover, while only one client computing device is illustrated in FIG. 1 to simplify and clarify the description, it is understood that any number of client computers or display devices are supported and can be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for creating and presenting insurance policy quotes based on data obtained from an image of a vehicle information sticker through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A graphical user interface (GUI) and server based system configured for real-time generation and editing of dynamic insurance policy quotes based on camera image data of new vehicles and user-specific data, the GUI and server based system comprising:

a server; and a dynamic policy module implemented at least partially on the server and at least partially on a smart phone, the dynamic policy module including a back-end portion executing on the server as software as a service (SaaS), and the dynamic policy module further including a client portion executing on the smart phone, wherein the client portion accesses the back-end portion via the server through a computer network, and further wherein the client portion is configured to display a graphical user interface (GUI) on a display of the smart phone, the smart phone associated with a user, and the dynamic policy module configured to:

generate, with the client portion of the dynamic policy module, a GUI on a display of the smart phone, the smart phone associated with the user;

capture, by a camera of the smart phone, an image comprising a vehicle information sticker of a new vehicle;

transmit, via the computer network, the image of the vehicle information sticker to the back-end portion of the dynamic policy module;

process, by the server, the image of the vehicle information sticker by extracting information from the image of the vehicle information sticker;

transform, by an API portion of the dynamic policy module, the image of the vehicle information sticker into a computer readable format by implementing one or more of optical character recognition, bar code scanning, or QR code scanning;

determine, by the API portion of the dynamic policy module based on the computer readable format of the image of the vehicle information sticker, that the new vehicle corresponds to a particular vehicle, the particular vehicle having a set of technical specifications;

retrieve, via the computer network, vehicle data corresponding to the particular vehicle from a vehicle database operating separately from the server;

generate automatically, by the server, a dynamic policy quote based on the set of technical specifications of the particular vehicle, the dynamic policy quote associated with one or more editable fields comprising one or more of: (i) a deductible amount, (ii) a liability amount, (iii) an uninsured motorist amount, or (iv) a damage coverage amount;

present, via the GUI of the smart phone, an editing interface, wherein the editing interface receives a user input to modify one or more of (i) the deductible amount, (ii) a liability amount, (iii) an uninsured motorist amount, or (iv) a damage coverage amount of the dynamic policy quote of the particular vehicle;

execute, via the client portion of the dynamic policy module, the GUI on the display of the smart phone, the GUI providing an editing interface for editing the dynamic policy quote for the particular vehicle in real-time, wherein editing the dynamic policy quote in real-time comprises:

(a) receiving, by the back-end portion executing on the server, edited policy information corresponding to the one or more of the editable fields, (b) receiving, by the back-end portion executing on the server, user data corresponding to demographic or lifestyle information of the user, (c) updating, by the back-end portion executing on the server, the dynamic policy quote of the particular vehicle based on the edited policy information and the user data to generate a new dynamic policy quote, (d) transmitting, to the client portion of the dynamic policy module, the new dynamic policy quote, (e) presenting, via the GUI of the smart phone, the new dynamic policy quote for the particular vehicle, (f) receiving, from the client portion of the dynamic policy module, an indication to purchase the new dynamic policy quote, (g) receiving, at the server, a purchase transaction corresponding to the new dynamic policy quote, and (h) generating a customer profile of the user associating the purchase transaction corresponding to the new dynamic policy quote with the new vehicle.

2. The GUI and the server based system of claim 1, wherein the image of the vehicle information sticker comprises one or more of: a make, a model, a year, a color, a manufacturer's suggested retail price (MSRP), a fuel economy, a quick response (QR) code, a standard equipment list, an optional equipment list, or a safety rating corresponding to the new vehicle.

3. The GUI and server based system of claim 1, wherein the image of the vehicle information sticker comprises one or more of: a vehicle identification number (VIN), a technical specification list, a fuel type, or an environmental impact rating.

4. The GUI and server based system of claim 1, wherein editing the dynamic policy quote in real-time further comprises: (f) generating a profile of the user associating the dynamic policy quote with the new vehicle.

5. The GUI and server based system of claim 1, wherein the image of the vehicle information sticker is a digital photo or digital video.

6. A graphical user interface (GUI) and server based method for real-time generation and editing of dynamic insurance policy quotes based on camera image data of new vehicles and user-specific data, the GUI and server based method comprising:

implementing a dynamic policy module, the dynamic policy module implemented at least partially on a server and at least partially on a smart phone, the dynamic policy module including a back-end portion executing on the server as software as a service (SaaS), and the dynamic policy module further including a client portion executing on the smart phone, wherein the client portion accesses the back-end portion via the server through a computer network;

generating, with the client portion of the dynamic policy module, a GUI on a display of the smart phone, the smart phone associated with a user;

capturing, by a camera of the smart phone, an image comprising a vehicle information sticker of a new vehicle;

transmitting, via the computer network, the image of the vehicle information sticker to the back-end portion of the dynamic policy module;

processing, by the server, the image of the vehicle information sticker by extracting information from the image of the vehicle information sticker;

transforming, by an API portion of the dynamic policy module, the image of the vehicle information sticker into a computer readable format by implementing one or more of optical character recognition, bar code scanning, or QR code scanning;

determining, by the API portion of the dynamic policy module based on the computer readable format of the image of the vehicle information sticker, that the new vehicle corresponds to a particular vehicle, the particular vehicle having a set of technical specifications;

retrieving, via the computer network, vehicle data corresponding to the particular vehicle from a vehicle database operating separately from the server;

generating automatically, by the server, a dynamic policy quote based on the set of technical specifications of the particular vehicle, the dynamic policy quote associated with one or more editable fields comprising one or more of: (i) a deductible amount, (ii) a liability amount, (iii) an uninsured motorist amount, or (iv) a damage coverage amount;

presenting, via the GUI of the smart phone, an editing interface, wherein the editing interface receives a user input to modify one or more of (i) the deductible amount, (ii) a liability amount, (iii) an uninsured motorist amount, or (iv) a damage coverage amount of the dynamic policy quote of the particular vehicle; and executing, via the client portion of the dynamic policy module, the GUI on the display of the smart phone, the GUI providing an editing interface for editing the dynamic policy quote for the particular vehicle in real-time, wherein editing the dynamic policy quote in real-time comprises:

(a) receiving, by the back-end portion executing on the server, edited policy information corresponding to the one or more of the editable fields, (b) receiving, by the back-end portion executing on the server, user data corresponding to demographic or lifestyle information of the user, (c) updating, by the back-end portion executing on the server, the dynamic policy quote of the particular vehicle based on the edited policy information and the user data to generate a new dynamic policy quote, (d) transmitting, to the client portion of the dynamic policy module, the new dynamic policy quote, and (e) presenting, via the GUI of the smart phone, the new dynamic policy quote for the particular vehicle, (f) receiving, from the client portion of the dynamic policy module, an indication to purchase the new dynamic policy quote, (g) receiving, at the server, a purchase transaction corresponding to the new dynamic policy quote, and (h) generating a customer profile of the user associating the purchase transaction corresponding to the new dynamic policy quote with the new vehicle.

7. The GUI and the server based method of claim 6, wherein the image of the vehicle information sticker comprises one or more of: a make, a model, a year, a color, a manufacturer's suggested retail price (MSRP), a fuel economy, a quick response (QR) code, a standard equipment list, an optional equipment list, or a safety rating corresponding to the new vehicle.

8. The GUI and server based method of claim 6, wherein the image of the vehicle information sticker comprises one or more of: a vehicle identification number (VIN), a technical specification list, a fuel type, or an environmental impact rating.

9. The GUI and server based method of claim 6, wherein editing the dynamic policy quote in real-time further comprises: (f) generating a profile of the user associating the dynamic policy quote with the new vehicle.

10. The GUI and server based method of claim 6, wherein the image of the vehicle information sticker is a digital photo or digital video.

11. A non-transitory, computer-readable medium storing instructions thereon for real-time generation and editing of dynamic insurance policy quotes based on camera image data of new vehicles and user-specific data, the instructions when executed by one or more processors cause the one or more processors to:

implement a dynamic policy module, the dynamic policy module implemented at least partially on a server and at least partially on a smart phone, the dynamic policy module including a back-end portion executing on the server as software as a service (SaaS), and the dynamic policy module further including a client portion executing on the smart phone, wherein the client portion accesses the back-end portion via the server through a computer network;

generate, with the client portion of the dynamic policy module, a GUI on a display of the smart phone, the smart phone associated with a user;

capture, by a camera of the smart phone, an image comprising a vehicle information sticker of a new vehicle;

transmit, via the computer network, the image of the vehicle information sticker to the back-end portion of the dynamic policy module;

process, by the server, the image of the vehicle information sticker by extracting information from the image of the vehicle information sticker;

transform, by an API portion of the dynamic policy module, the image of the vehicle information sticker into a computer readable format by implementing one or more of optical character recognition, bar code scanning, or QR code scanning;

determine, by the API portion of the dynamic policy module based on the computer readable format of the image of the vehicle information sticker, that the new vehicle corresponds to a particular vehicle, the particular vehicle having a set of technical specifications;

retrieve, via the computer network, vehicle data corresponding to the particular vehicle from a vehicle database operating separately from the server;

generate automatically, by the server, a dynamic policy quote based on the set of technical specifications of the particular vehicle, the dynamic policy quote associated with one or more editable fields comprising one or more of: (i) a deductible amount, (ii) a liability amount, (iii) an uninsured motorist amount, or (iv) a damage coverage amount;

present, via the GUI of the smart phone, an editing interface, wherein the editing interface receives a user input to modify one or more of (i) the deductible amount, (ii) a liability amount, (iii) an uninsured motorist amount, or (iv) a damage coverage amount of the dynamic policy quote of the particular vehicle; and execute, via the client portion of the dynamic policy module, the GUI on the display of the smart phone, the GUI providing an editing interface for editing the dynamic policy quote for the particular vehicle in real-time, wherein editing the dynamic policy quote in real-time comprises:
  (a) receiving, by the back-end portion executing on the server, edited policy information corresponding to the one or more of the editable fields,
  (b) receiving, by the back-end portion executing on the server, user data corresponding to demographic or lifestyle information of the user,
  (c) updating, by the back-end portion executing on the server, the dynamic policy quote of the particular vehicle based on the edited policy information and the user data to generate a new dynamic policy quote,
  (d) transmitting, to the client portion of the dynamic policy module, the new dynamic policy quote, and
  (e) presenting, via the GUI of the smart phone, the new dynamic policy quote for the particular vehicle,
  (f) receiving, from the client portion of the dynamic policy module, an indication to purchase the new dynamic policy quote,
  (g) receiving, at the server, a purchase transaction corresponding to the new dynamic policy quote, and
  (h) generating a customer profile of the user associating the purchase transaction corresponding to the new dynamic policy quote with the new vehicle.

12. The non-transitory, computer-readable medium of claim 11, wherein the image of the vehicle information sticker comprises one or more of: a make, a model, a year, a color, a manufacturer's suggested retail price (MSRP), a fuel economy, a quick response (QR) code, a standard equipment list, an optional equipment list, or a safety rating corresponding to the new vehicle.

13. The non-transitory, computer-readable medium of claim 11, wherein the image of the vehicle information sticker comprises one or more of: a vehicle identification number (VIN), a technical specification list, a fuel type, or an environmental impact rating.

14. The non-transitory, computer-readable medium of claim 11, wherein editing the dynamic policy quote in real-time further comprises: (f) generating a profile of the user associating the dynamic policy quote with the new vehicle.

15. The non-transitory, computer-readable medium of claim 11, wherein the image of the vehicle information sticker is a digital photo or digital video.

* * * * *